United States Patent
Donjon et al.

[11] 3,781,469
[45] Dec. 25, 1973

[54] OPTIC RELAY FOR SCANNING BY MEANS OF A LIGHT BEAM

[75] Inventors: Jacques Donjon, Yerres; Gerard Joseph Marcel Marie, L'Hay-les-Roses, both of France

[73] Assignee: U. S. Philips Corporation, New York, N.Y.

[22] Filed: July 14, 1971

[21] Appl. No.: 162,565

[30] Foreign Application Priority Data
July 17, 1970 France .................................. 7026419

[52] U.S. Cl. ......... 178/7.3 D, 178/5.4 BD, 350/150
[51] Int. Cl. ........................... H04n 3/02, H04n 9/14
[58] Field of Search ................... 178/7.3 P, 5.4 BD; 350/150; 250/213 UT

[56] References Cited
UNITED STATES PATENTS

| | | | |
|---|---|---|---|
| 2,858,363 | 10/1958 | Kazan .............................. | 178/7.5 D |
| 3,520,589 | 7/1970 | Angel et al. ......................... | 350/150 |
| 3,541,254 | 11/1970 | Orthuber .......................... | 178/7.3 D |
| 3,601,468 | 8/1971 | Dailey................................. | 350/150 |
| 3,499,157 | 3/1970 | Satake et al. ....................... | 350/150 |
| 3,479,510 | 11/1969 | Baumberger et al. .............. | 350/150 |
| 3,569,988 | 3/1971 | Schmidt et al. ............... | 178/5.4 BD |

*Primary Examiner*—Benedict V. Safourek
*Assistant Examiner*—Joseph A. Orsino, Jr.
*Attorney*—Frank R. Trifari

[57] ABSTRACT

An optic relay comprising a double refracting crystalline plate which can be varied by the Pockels effect, the signal being applied between two transparent layers.

According to the invention the scanning of one of the faces of the plate is realized by a light beam acting on a photoemissive layer or a photoconductive layer.

2 Claims, 7 Drawing Figures

INVENTORS
JACQUES DONJON
GERARD JOSEPH MARCEL MARIE

OPTIC RELAY FOR SCANNING BY MEANS OF A LIGHT BEAM

The present invention relates to an optic relay tube constituted by an evacuated space comprising at least one transparent window, a plate of a material having double refraction which is variable as a function of the electric field applied on both sides, and means permitting a face of the said plate to be scanned.

Among the devices of the type mentioned above may be cited the relays described in the French patent Nos. 1,473,212 and 1,479,284. In these relays, the plate of the material having Pockels effect is scanned by the electron beam emitted by a gun. As regards the geometric properties of the images they produce, the known relays have the defect inherent in all the picture devices which use scanning by electron beams:

non-linearity of the scans in x and in y as a function of time;

variation of the amplitudes of scanning under the effect of the variations of the supply voltages or variations of the ambient electric or magnetic fields;

difficulty in obtaining precise and landom scannings (guiding and maintenance of the spot in a point of determined coordinates).

These defects are particularly serious in certain fields of application and in particular when several images originating from different relays of independent scanning (for example, colour television) are to be superimposed, or when the relay is used as a memory, the information being read by an optic scanning device, which may use, for example, a flying spot or a laser beam associated with a digital deflection system.

It is the object of the present invention to remedy said inconveniences by substituting an optic scanning device for an electronic scanning device previously used.

According to the present invention, the optic relay tube constituted by an evacuated space comprising at least one transparent window, a plate of a material having a double refraction which is variable as a function of the applied electric field on both sides, and means permitting the scanning of a face of the said plate, is characterized in that a photosensitive layer is placed parallel to and in the proximity of the said plates.

In the following description it is to be noted that the object of said scanning of the target is, as in the above-mentioned patents, to permit the writing of information at the desirable point and instant. The actual information is written in the crystal as in the above-mentioned patents by means of two electrodes. So it is essentially a commutation function.

The invention is based on the idea that it is possible to obtain a great precision and a good superposition of several images with an optic scanning:

in the case of the superposition of several images, a single optic scanning member may be used, (flying spot or laser associated with a deflection system), and separators which permit of switching the same scanning on the various optic relays;

in the case in which the relay is used as a memory, the same optic scanning device which is used for writting may be used for reading;

finally, a perfectly stable optic scanning may be used, such as may be obtained with a laser associated with a digital deflection system.

Other characteristics and advantages of the invention will appear during the following prescription of a few embodiments with reference to the Figures, in which.

Figure 1:
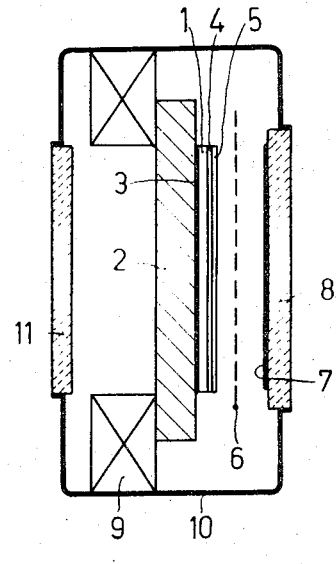
FIG. 1 shows a first embodiment.

In a first embodiment according to the invention shown in FIG. 1, the target plate 1 is glued on its support 2 of fluorite and coated on the side of the support by a transparent conductive layer 3 and on the other side by an insulating mirror 4 and a secondary emission layer 5; an anode 6 in the form of a grid is placed very close to the target (at a distance of a few tens of microns), and its object is to collect the secondary electrons emitted by the bombardment of the target; a photoemissive layer 7, deposited on a transparent conductive layer and a second transparent window 8, (the layer 7 may be deposited, for example, on the window 8), which must be parallel to the plane of the grid and placed at such a distance that a proximity focusing is obtained, said distance is of the order of a mm or of a fraction of a milimetre.

The optic relay comprises in addition a cooling member 9, which may be a Peltier cooling element and which permits the target to operate in the proximity of its Curie point; the assembly is placed in an evacuated space 10 closed by the windows 8 and 11.

An accelerating voltage of a few hundred volts (from 200 to 2,000 volts, for example) is applied between the photoemissive layer 7 and the grid 6, so as to obtain a sufficient focusing and in such manner that in the case of saturation, the secondary emission level of the bombarded face 5 is higher than 1.

The equilibrium potential of the points of the bombarded target 1 is a few volts higher than that of the grid-anode 6. The electron beam issued by the photoemissive layer 7 thus acts, to a few volts, as a flying short-circuit between the target and the anode-grid. As the signal voltage is applied between the grid 6 and the transparent conductive layer 3, the various points of the target are charged to the voltage corresponding to the instant at which they are touched by the beam. In order to avoid the deterioration of the resolution, the step of the grid 6 must be smaller than or equal to the distance which separates two picture elements (of the order of 50 /µ in the initial optic relay).

Figure 2:
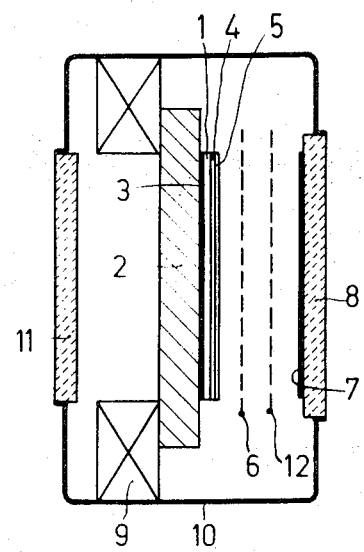
FIG. 2 shows an embodiment derived from the first by the addition of a supplementary grid.

In a second embodiment of the invention shown in FIG. 2, a second grid 12 is placed between the photoemissive layer 7 and the grid-anode 6; the object of said second grid is to ameliorate the collection of the secondary electrons. The potential of said grid 12 must be at least 50 volts higher than that of the gridanode 6. The distances between the elements 6, 12 and 7 are still of the order of a millimetre or of a fraction of a mm to ensure a satisfactory proximity focusing.

In order to avoid a deterioration of the resolution, the steps of the grids 6 and 12 must be smaller than or equal to the distance which separates two picture elements. In order to avoid a moire effect, several solutions are possible.

if two grids with square meshes are used, there will be a difference in phase of 45° of the orientation of the meshes of one grid relative to the meshes of the other;

if one grid with square meshes is used, and one grid with simple bars, the bars of the latter will be oriented 45° from the direction of the crossed bars of the first;

if two grids with simple bars are used, the bars of one will be oriented 90° in the direction of the bars of the other.

In order to permit the use of a low power optical scanning system, it may be envisaged to arrange between the source and the optic relay an image intensifier comprising essentially a photoemissive layer and a luminescent layer. This luminescent layer must be chosen to be sufficiently rapid, for example, of the type used in the "flying spot." In order to be able to take full advantage of the gain of the intensifier, which is of the order of a few tens, an intensifier could be used comprising an output window of optical fibres and, in the two embodiments of the optic relay just described (FIGS. 1 and 2), a window 8 of optical fibres could be used. The optic relay and the intensifier will then be placed against each other.

Figure 3:
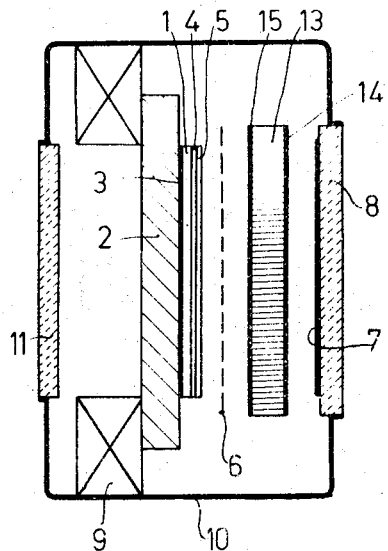
FIG. 3 shows an embodiment using an electron multiplier structure.

In FIG. 3, which shows a third embodiment of the optic relay, the peceding image intensifier is incorporated in the tube of FIG. 1. For that purpose, a thin glass sheet or a disc of optical fibres 13 is introduced between the elements 6 and 7; this element is covered on one side by a rapid luminescent layer 14 (deposited on a transparent conductive layer or covered by a thin layer of aluminium), and on the other side by a photoemissive layer 15) deposited on a transparent conductive layer). A voltage of several k.volts is applied between 7 and 14 as in a conventional image intensifier tube; the same voltages as were applied between 7, 6 and 3 in the first embodiment are applied between 15, 6 and 3. In order to ensure a satisfactory proximity focusing, the distances between the elements 15, 6 and 3 are of the order of a mm or of a fraction of a millimetre and the distance between the elements 7 and 14 is of the order of a mm or a few mms.

Figure 4:
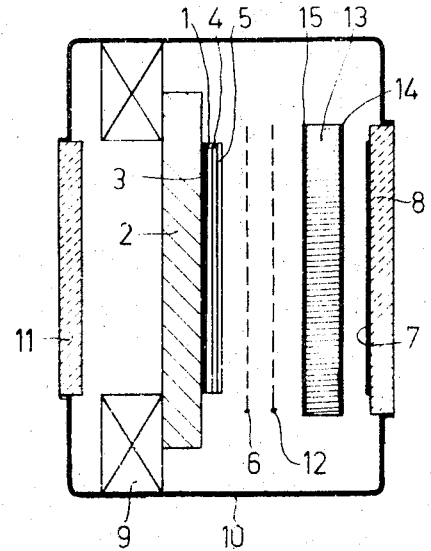
FIG. 4 shows a second embodiment using an electron multiplier structure.

In a fourth embodiment according to the invention (FIG. 4) a supplementary grid 12 placed between the photoemissive layer 15 and the grid-anode 6, is added to the preceding device (FIG. 3); the object of the grid 12 is to ameliorate the collection of the secondary electrons, as in the second embodiment (FIG. 2). The distances between said grid 12 and the elements 15 and 16 will be of the order of a mm or of a fraction of a mm. The potential of 12 will be at least 50 volts higher than that of the grid-anode 6.

In a fifth and sixth embodiment, an electron multiplier stage is substituted for the intensifier stage of the embodiments 3 and 4. The arrangements remain the same as those of FIGS. 3 and 4, in which 13 becomes a wafer of electron multipliers having microchannels and 14 and 15 electrodes deposited on the faces of said wafer. An accelerating voltage of a few hundred volts is applied between the photoemissive layer 7 and the electrode 14 and a voltage which is sufficient to obtain the multiplier effect is applied between the electrodes 14 and 15: of the order of approximately a thousand volts. Between the electrode 15, the grid-anode 6, the supplementary grid 12 and the transparent conductive layer 3, are applied the same voltages which were applied in the two first embodiments (FIGS. 1 and 2) between the photoemissive layer 7, the grid-anode 6, the supplementary grid 12 and the transparent conductive layer 3. The distances between the various elements are of the order of a mm of a fraction of a mm to ensure a satisfactory proximity focusing.

The main advantage of the embodiments 5 and 6 is to add a very important multiplier effect, of the order of several thousands or of tens of thousands, between the optic scanning and the electronic scanning on the target. This permits of considerably reducing the candle-power required by the optic scanning. Another advantage is obtained when the microchannels enclose an angle, relative to the axis of the relay, which is large enough for the wafer to be not transparent to the light rays. The opacity of the wafer then gives the advantage of a total separation between the writing and reading light beam.

Figure 5:
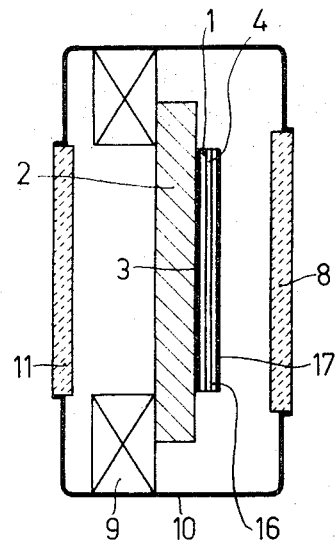
FIG. 5 shows an embodiment in which the photoconductive layer is placed against the insulating mirror.

FIG. 5 shows a seventh embodiment according to the invention, in which the greater part of the elements of FIG. 1 are incorporated: the target plate 1, glued on its transparent support 2 and covered on the side of the support by the transparent conductive layer 3, and on the other side by an insulating mirror 4; the cooling device 9, the evacuated space 10 and the windows 8 and 11 are also present. In this seventh embodiment, two layers 16 and 17 are added which are deposited successively on the insulating mirror 4. The layer 16 is a photoconductive layer which must be conductive only when light of a determined spectral band is incident on it. The layer 17 is a transparent conductive layer. The writing signal is applied between the two transparent conductive layer 3 and 17.

It is to be noted that in this embodiment it is not necessary to maintain the assembly in a vacuum; however, this measure remains advantageous for practical cooling problems.

Figure 6:
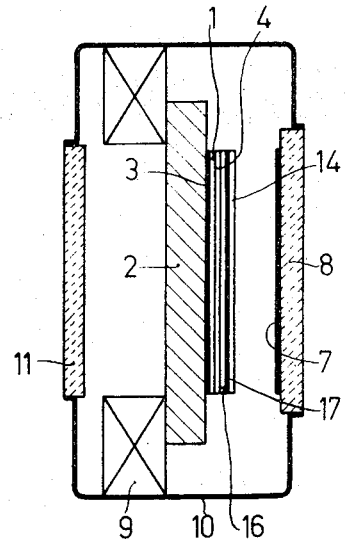
FIG. 6 shows an embodiment derived from the preceding case by the addition of an image intensifier.

In an eighth embodiment according to the invention an image intensifier is incorporated in the device shown in FIG. 5; this intensifier (FIG. 6) is composed of a photoemissive layer 7 (comprising a transparent conductive layer) deposited on the window 8, for example, and of a rapid luminescent layer 14 deposited on the transparent conductive layer 17. A voltage of a few k.volt is applied between the elements 7 and 17; the distance between said elements must be of the order of a mm or a few mms so as to ensure a proximity focusing.

As compared with the seventh embodiment, this eighth embodiment has the advantage of providing a gain of a few tens in candle-power, which permits of using low power optic scanning system. This embodiment also presents the advantage of permitting a conversion of the spectral band of scanning which allows of a larger choice of the photoconductive layer, for example, a sensitive layer in the ultraviolet.

In the various embodiments 1 to 8 according to the invention, it is necessary to suitably separate the reading and writing light beams so as to avoid errors. In the case of the devices 5 and 6, said separation may be ensured by using a wafer the microchannels of which enclose a sufficient angle relative to the axis. In all the cases it may in addition be ensured in different manners:

by using an insulating mirror 4, which is sufficiently opaque to the writing and reading light; this insulating mirror may be of the multi-dielectric type; in addition it may comprise, on the side opposite to the plate, a layer absorbing the luminous radiations;

by using different spectral bands for writing and reading. So a photoemissive layer 7 may be used (FIGS. 1 to 4) or a photoconductive layer 16 (FIG. 5) sensitive not only in the spectral band of the writing beam, and, on the reading side, either a filter which cuts said band or a detector which is not sensitive in said band may be used. As a writing spectral band may advantageously be chosen, the violet band of the visible spectrum or the near ultraviolet. The filter which cuts the writing spectral band may be introduced between the dielectric mirror 4 and the layer 5 (FIG. 1 to 4) or the layer 16 (FIG. 5) or even in any place of the reading space, that is to say no matter where on the left of the mirror 4 and in particular beyond the optical relay.

A particular arrangement may be chosen in the case of the embodiments 1, 2 and 7 (FIGS. 1, 2 and 5) when different spectral bands are used for the writing and reading beams. In this new arrangement a filter is used as an insulating mirror 4 which is reflective to the reading beam and transparent to the writing beam. This filter may be, for example, of the multi-dielectric type. It is thus possible to omit the window 8, and to cause the writing and reading beams to arrive on the same face of the optic relay through the window 11. This arrangement presents the advantage of permitting the use of the same optic scanning device for reading and writing, the choice between said two functions being made by selection of the spectral band used. In the case in which the optic scanning device comprises a light deflection system and, either a laser emitting on at least two wave lengths, or two lasers, the commutation writing-reading can easily be made by means of electro-optic Kerr or Pockels cells.

Figure 7:
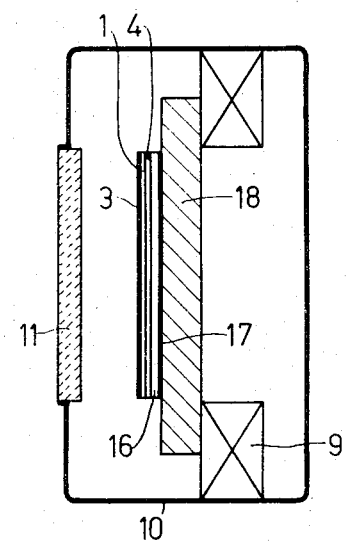
FIG. 7 shows an embodiment analogous to that of FIG. 5 but comprising a single window.

In the case of the seventh embodiment (FIG. 5) the conductive layer 17 need no longer be transparent. Moreover, it is possible to omit the support of the transparent target and to replace it by a support 18 which may be opaque, placed on the right hand of the plate 1. The assembly of the plate 1 and the layers 4, 16 and 17 is then glued on said support as is shown in FIG. 7.

It will be obvious that other embodiments are possible to those skilled in the art without therefor departing from the scope of the present invention. For example, the optic relay may constitute a high capacity memory by association with a laser source controlled by a digital deflection system, the reading of the memory which is non-destructive may be realized by a reading beam, which is comparable to the writing beam. The problem of the coincidence of the two scanning beams may be solved by using two identical deflectors, or one light deflector succeeded by a polarisation commutator, and a polarizing separator permitting to reach at will either the writing face or the reading face. However, this necessitates the use of deflection mirrors and does not permit the simultaneous reading and writing. The light source used may be, for example, an argon or xenon laser or even a mercury arc lamp.

Of course the use of the plate having electrooptic effect, which may be, for example, of diacid phosphate of deuterated potassium, requires a source of polarized light.

Another application of the optic relay according to the invention is the realisation of a projection assembly of colour television images by superposition of the given pictures by three relays of which the perfectly synchronous scanning is obtained by division of a primary beam into three secondary beams each of which scans the writing face of a relay.

What is claimed is:

1. An optic relay comprising an evacuated enclosure provided with a transparent window, a plate of electrooptic material in the enclosure and having a birefringence varying as a function of the voltage between the faces thereof at temperatures near the Curie-point, means for maintaining the temperature of the plate near the Curie-point, an insulating mirror on the face of the plate, means comprising a secondary emission layer having a secondary emission coefficient greater than one deposited on the mirror and a photoemissive layer for converting radiation from a light beam scanned through the transparent window into an electron scan, modulating means comprising a transparent conductive layer deposited on a second face of the plate and a grid placed between the secondary emission layer and the photoemissive layer in the proximity of the secondary emission layer for varying the intensity of the electron scan thereby to vary the voltage across the scanned areas of the plate in response to an electric signal, a glass plate located between the photoemissive layer and grid, a luminescent layer on a face of the glass plate opposite the photoemissive layer whereby a voltage of a few kilowatts may be applied between the photoemissive layer and the luminescent layer.

2. An optic relay as claimed in claim 1, characterized in that the above glass plate 13 is a plate of optical fibres.

* * * * *